Jan. 12, 1960

R. A. TIEDEMANN 2,920,856

WELD HEAD POSITIONING APPARATUS

Filed Oct. 8, 1956

INVENTOR.
RICHARD A. TIEDEMANN
BY
Andrus + Scales
Attorneys

Jan. 12, 1960 R. A. TIEDEMANN 2,920,856
WELD HEAD POSITIONING APPARATUS
Filed Oct. 8, 1956 2 Sheets-Sheet 2

INVENTOR.
RICHARD A. TIEDEMANN
BY
Andrus + Scales
Attorneys

2,920,856
WELD HEAD POSITIONING APPARATUS

Richard A. Tiedemann, Milwaukee, Wis., assignor to A. O. Smith Corporation, Milwaukee, Wis., a corporation of New York Application October 8, 1956, Serial No. 614,724

6 Claims. (Cl. 248—284)

This invention relates to apparatus for positioning an automatic weld head and particularly to an improved actuating apparatus for a folding parallelogram support.

A welding head is normally supported on the end of a boom or the like which is adapted to dispose the end of the welding electrode in the approximate welding position. Then, to accurately position the end of the electrode, a fine adjustment mechanism is provided which is adapted for relative small movement of the weld head.

For example, a pivoting structure for fine adjustment is disclosed and claimed in the applicant's copending application which is assigned to a common assignee with the present application. The copending application is entitled, Welding Head Positioner, with Patent Office Serial No. 614,723 and filed on the same date as the present application.

The present invention provides apparatus for moving the welding head in a generally vertical direction by the use of a folding parallelogram structure.

In accordance with the present invention a bearing surface is provided in combination with the means to secure to the weld head to the parallelogram. A triangularly-shaped pivoted member is pivoted about a relatively stationary support and engages the bearing surface to effect a folding and unfolding of the parallelogram.

The accompanying drawings illustrate the best mode presently contemplated by the inventor for carrying out the invention.

Figure 1:
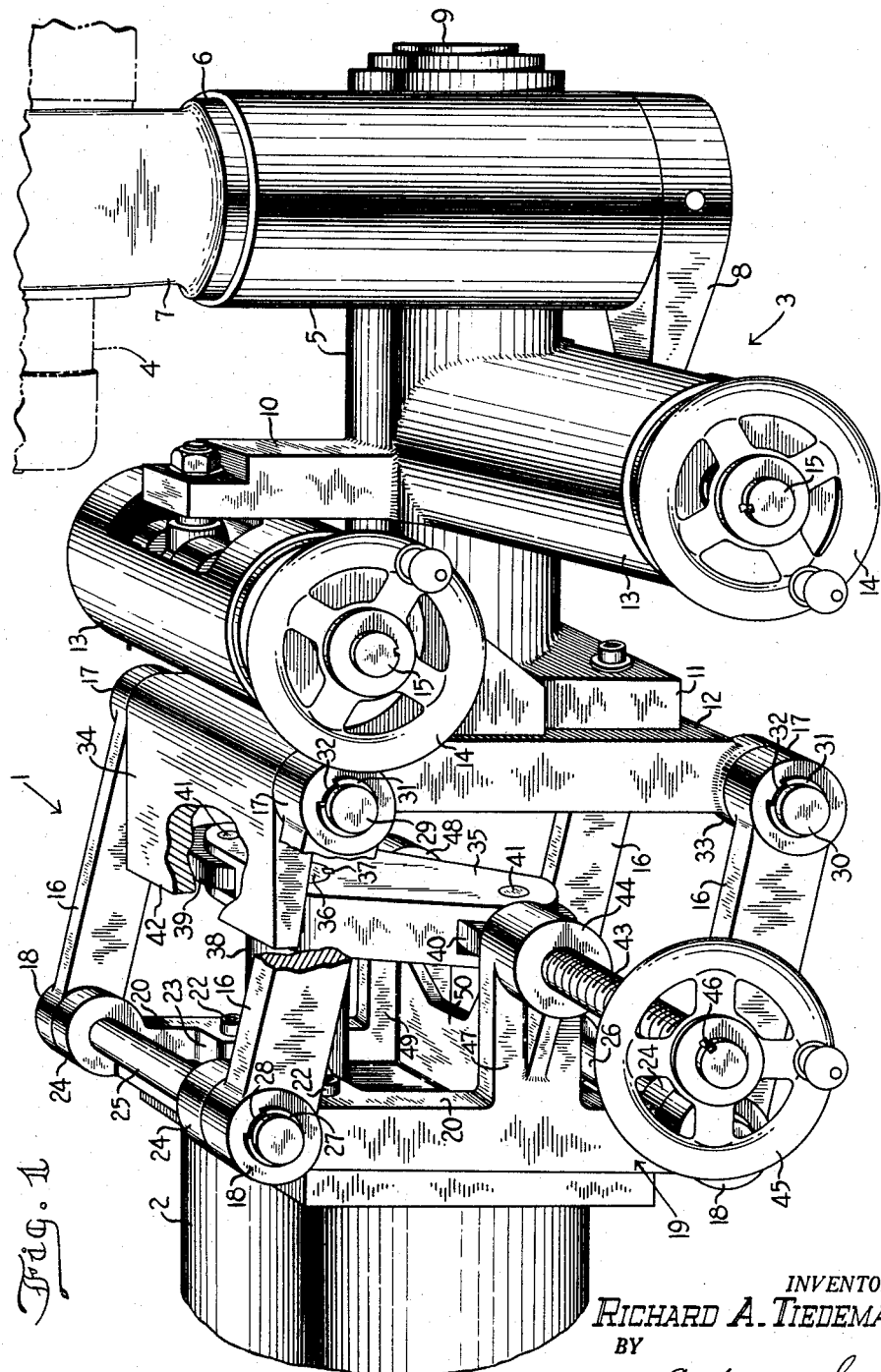
Figure 1 is a perspective view of a weld head positioning apparatus.

Referring to the drawing and particularly to Figure 1, the paralleleogram structure designated generally by 1 is secured to the free end of a support boom 2 and to a weld head support and rotating structure 3 which is adapted to support a welding head, a fragmentary portion of which is shown by phantom lines 4.

The boom 2 of which only the free end is shown is a conventional horizontally disposed support which normally is pivotally supported for rotation and for vertical movement through a suitable mechanism, not shown.

The rotating structure 3 and weld head, shown by phantom lines 4, is shown for purposes of illustration and is fully disclosed and claimed in the previously referred to copending application of the present applicant.

In general, the structure 3 disclosed in the copending application comprises a pair of hollow cylinders 5 secured to each other with the axis of one in a horizontal plane and that of the other in a vertical plane. A shaft 6 is journaled in the vertically disposed cylinder and supports the weld head 4 by a C-clamp 7, of which only the lower portion is shown, secured to one end of shaft 6. A pivotal arm 8 is secured to the opposite end and pivoted about the axis of shaft 6 to pivot the shaft and attached welding head. The arm 8 is pivoted in any suitable manner, not shown, for example, such as disclosed in the previously referred to copending application of Richard A. Tiedemann.

A relatively stationary shaft 9 is journaled in the horizontally disposed cylinder 5 which pivots about the shaft 9 in response to pivotal movement of an arm 10 secured to the outer surface of the cylinder. The stationary shaft 9 extends from a vertically disposed mounting plate 11 which is bolted or otherwise secured to vertically movable bracket 12 on the parallelogram 1.

Each of the pivoting arms 8 and 10 are pivoted through similar drive means 13 including a handwheel 14 attached to a longitudinally moving shaft 15 which operatively engages the ends of each arm as shown only for the arm 10 in Figure 1. Each shaft 15 extends transversely of the associated arms and as the handwheel 14 is turned the associated shaft moves longitudinally and pivots the arm.

The pivoting structure 3 and weld head 4 are moved as a unit in a vertical direction by the parallelogram structure 1 which includes the movable plate 12 to which the mounting plate 11 is secured.

The parallelogram structure 1 includes four arms 16 disposed to form four edges of a parallelogram structure with the forward end 17 of the arms pivotally connected to the movable plate 12 and with the rearward end 18 of the arms connected to a relatively stationary bracket 19 which, in turn, is secured to the boom 2.

Figure 2:
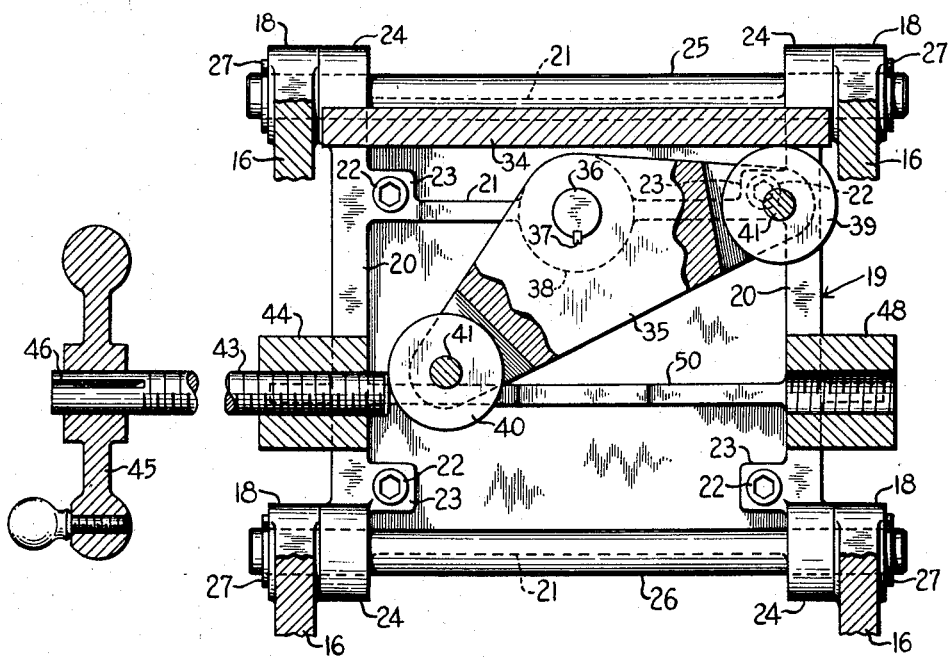
Fig. 2 is a view in section of the lifting mechanism for folding and unfolding a parallelogram structure on a vertical plane extending transversely through the parallelogram structure shown in Figure 1.

As more clearly shown in Fig. 2, the stationary bracket 19 is generally ladder-shaped having vertically disposed and spaced side members 20 with a series of vertically spaced connecting yokes 21 joining the side members. The bracket 19 is secured to the boom 2 by bolts 22 which pass through suitable lugs 23 integrally formed with bracket 19 and thread into boom 2.

The bracket side members 20 terminate at each end in apertured ears 24 to provide a bearing support for an upper pin 25 and a lower pin 26 which pivotally support the arms.

The rearward end 18 of each arm 16 also terminates in apertured ears and are secured on the upper and lower pins 25 and 26, respectively, by snap rings 27 disposed one to each end of the pins. The snap rings 27 snap into grooves 28 provided adjacent each end of the pins 25 and 26.

The forward end 17 of the arms similarly terminate in apertured ears and are similarly secured to the outer ends of an upper pin 29 and a lower pin 30 which are secured in the upper and lower edge of the movable plate 12. Snap rings 31 are snapped into grooves 32 adjacent each end of the pins 29 and 30 to secure the arms to the pins.

To provide a journal for the upper pin 29 in the plate 12, the upper edge of the plate 12 is provided with a transverse opening receiving the upper pin 29.

To provide journals for the lower pin 30 in the plate 12, apertured ears 33 are formed at each of the lower corners of the plate 12 with the pin 30 journaled therein.

Therefore, as the parallelogram 1 is folded and unfolded, the plate 12 moves in a small arc as defined by the pivot connection of the arms 16 to the bracket 19. The plate 12 is at all times maintained in a vertical plane due to the folding action of the parallelogram.

To control the position of the plate 12, an integral flange 34 extends rearwardly from the upper edge of the plate and provides a bearing surface for a triangularly-shaped pivotal member 35. The flange 34 is shown as integrally formed with the plate 12.

As more clearly shown in Fig. 2, the triangularly-shaped pivotal member 35 is a generally triangular shaped member keyed at an apex to a shaft 36 as by key 37. The shaft 36 is journaled in a cylinder 38 which extends forwardly from an intermediate yoke member 21. The other two apexes of the triangularly-shaped pivotal member 35 are bifurcated to receive rollers 39 and 40 which are each journaled on a shaft 41 which is secured one within the arms of each apex.

When the triangularly-shaped pivotal member 35 is pivoted about the cylinder 38, as more fully described hereinafter, the roller 39 engages the underside of the flange 34 and supports the flange 34 and attached plate 12. If the triangularly-shaped pivotal member 35 is rotated in one direction, shown as counterclockwise in Fig. 2, the flange 34 and plate 12 are forced upwardly. If the triangularly-shaped pivotal member 35 is rotated in the opposite direction, the flange 34 and plate 12 are lowered by the weight of the attached welding head 4 and the rotating structure 3 gravity biasing the parallelogram structure to a folded position.

The cylinder 38 within which the shaft 36 is journaled is integrally formed with and extends forwardly from the yoke member 21 of the bracket 19 to dispose the triangularly-shaped pivotal member 35 forwardly of rear edge 42 of the flange 34. The previously described movement of the plate 12 is in a small arc and the triangularly-shaped pivotal member 35 is therefore disposed somewhat intermediate the flange to prevent the flange from moving forwardly and disengaging the triangularly-shaped pivotal member.

Pivoting of the triangularly-shaped pivotal member 35 is controlled by a longitudinally moving shaft 43 through a threaded embossment 44 which is in the same vertical plane as the triangularly-shaped pivotal member 35. The shaft 43 threads through the embossment 44 into biasing engagement with the roller 40. When the shaft 43 is threaded toward the roller 40, it pivots the triangularly-shaped pivotal member 35 in a counterclockwise direction and when it is threaded away from the roller 40, it pivots the triangularly-shaped pivotal member 35 in a clockwise direction respectively raising and lowering the plate 12.

A small handwheel 45 is keyed as by key 46 to the outer end of the shaft 43 to facilitate operation of the shaft 43 and the resulting movement of the triangularly-shaped pivotal member 35.

The threaded embossment 44 is supported by an arm 47 extending from the one vertical side member 19.

As shown in Fig. 2, a similar threaded embossment 48 is secured to the opposite vertical side member 20 by an arm 49 to allow the apparatus to be changed for manual control from the opposite side of the parallelogram structure 1. To change to right hand control, the threaded shaft 43 is transferred to the right-hand embossment 48 and the triangularly-shaped pivotal member 35 is removed from the shaft 36 and turned to dispose the roller 39 in engagement with the end of the shaft 43 and the roller 40 in engagement with the undersurface of the flange 34.

A strengthening plate 50 may be employed between the arms 47 and 49 and the lower bracket yoke 21 to add rigidity to the arms. The plate 50 is horizontally disposed and welded or otherwise secured to the arms and the yoke.

The present invention provides a simple, rugged actuator for a parallelogram support for fine adjustment of the position of a welding head.

Various modes of carrying out the invention are contemplated as being within the scope of the following claims particularly pointing out and distinctly claiming the subject matter which is regarded as the invention.

I claim:

1. A folding parallelogram apparatus adapted to be secured to a relatively stationary support and having a vertically movable forward member adapted to support a member, which comprises a bearing member extending laterally from the forward member, a pivotal means having at least three apexes and disposed beneath said bearing surface, said pivotal means being adapted to be pivoted about one of said apexes to dispose a second apex into engagement with the undersurface of the bearing member to support the forward member and to move the forward member, and means engaging the third apex to pivot the pivotal means.

2. A folding parallelogram structure adapted to be secured to a relatively stationary support and having a vertically movable forward member and means to secure a member to said forward member, said member gravity biasing the forward member downwardly to fold the parallelogram, which comprises a rearwardly extending flange secured to the forward member, a pivotal means having a plurality of apexes and being disposed beneath the flange and pivotally supported at one apex of said pivotal means, and means to pivot the pivotal means about the supported apex to effect engagement between the flange and another apex of the pivotal means and thereby effect a lifting of the forward member and the member against said gravity bias.

3. In a folding parallelogram structure having a stationary support and a movable plate joined by four pivoting arms, a flange extending rearwardly from the upper edge of the plate toward the stationary support, a pivotal member pivotally journaled within the space defined by said four arms and having a bearing surface, and means to pivot the pivotal member to bring the bearing surface into lifting engagement with said flange to raise and lower said movable plate.

4. A weld head positioner, which comprises a generally rectangularly shaped support bracket, four arms pivotally attached one to each corner of the bracket, a generally rectangularly shaped movable plate, pivotal means to secure the outer end of said four arms to the four corners of the movable plate to provide a folding parallelogram, a flange extending rearwardly from the upper edge of the movable plate toward the support bracket and adapted to move between the adjacent arms, a shaft extending from an intermediate portion of the support bracket and terminating beneath the flange, a triangular member journaled at one cam apex on the end of the shaft, a transversely moving rod adapted to engage a second apex of the triangular member and to thereby pivot the triangular member about the shaft and bring the third apex into moving engagement with the flange to control the position of the movable plate, and means to support said rod.

5. A weld head positioner, comprising a pair of spaced bracket members, four arms pivotally secured to the brackets in spaced relation to form a folding parallelogram structure, means to secure one of said brackets to a relatively stationary support with the arms adapted to pivot in vertical planes to vertically position the other of said brackets, means to secure the other of said brackets to a welding head, a pivot shaft extending forwardly from said first named bracket and terminating in spaced relation to the second named bracket within the space described by said arms in an unfolded position, a triangular shaped member journaled at a an apex on the shaft, a shaft disposed transversely of the parallelogram structure with one end engaging a second apex of the triangular shaped member and movable in a longitudinal direction to pivot the cam about the shaft, a journal secured to one vertical edge of the first named bracket and having the longitudinally movable shaft journaled therein, a flange extending rearwardly from the upper edge of the second named bracket toward the first named bracket and over the triangular shaped member whereby the third apex of the triangular shaped member is maintained in engagement with the undersurface of the flange to move the flange and the attached bracket in a generally vertical direction, and a second journal secured to the other vertical edge of the first named bracket to allow journaling of a shaft therein and control of the triangular shaped member from the corresponding side of the parallelogram.

6. A weld head positioner in accordance with claim 5 having rollers secured to the second apex and to the third apex to provide a rolling contact with the shaft and the flange.

References Cited in the file of this patent

UNITED STATES PATENTS

| | | |
|---|---|---|
| 2,351,846 | Swim | June 20, 1944 |
| 2,467,056 | Schmidtke | Apr. 12, 1949 |
| 2,568,289 | Morey | Sept. 18, 1951 |
| 2,743,343 | Anderson | Apr. 24, 1956 |
| 2,757,888 | Branstrator | Aug. 7, 1956 |